Sept. 16, 1969     R. W. MEYER     3,467,299
PROOF-OF-PURCHASE COMPARTMENT ENVELOPE
Filed April 1, 1968

INVENTOR
Robert W. Meyer

BY *Griesbauer & Laubscher*
ATTORNEYS

United States Patent Office 3,467,299
Patented Sept. 16, 1969

3,467,299
PROOF-OF-PURCHASE COMPARTMENT ENVELOPE
Robert W. Meyer, Northport, N.Y., assignor to Boise Cascade Corporation, Boise, Idaho, a corporation of Delaware
Filed Apr. 1, 1968, Ser. No. 717,693
Int. Cl. B65d 27/04
U.S. Cl. 229—70                                          1 Claim

ABSTRACT OF THE DISCLOSURE

A proof-of-purchase compartmented envelope, characterized by the provision of a blank containing a first separable store redeemable premium coupon portion, and a second proof-of-purchase portion foldable into an envelope having a pair of open-topped compartments. One of the compartments is adapted to receive a portion (for example, a box top) of the goods purchased with the aid of the store redeemable coupon, and contains a window through which the box top or the like is visible.

---

Various types of business promotional schemes have been proposed in the past for encouraging the sale of commercial goods. For example, in the prior patents to Hiersteiner No. 3,334,806, Mooney No. 2,954,154, and Greason No. 3,356,286, sales promotional envelopes are disclosed that include detachable coupon portions.

In accordance with the basic concept of the present invention, by combining an ordinary store redeemable "premium" coupon with a special "proof-of-purchase" coupon-envelope, a sustained product movement is achieved from a single promotional effort by creating an automatic incentive for two purchases. This scheme is particularly desirable when a new product is being introduced on the market. By making it feasible to distribute two coupons at a time, the cost per product movement is greatly reduced. More particularly the inventive concept is based on the fact that two coupons of lesser value have a cumulative appeal, approaching that of a single coupon of higher value. For example, a buyer might use a conventional premium coupon to achieve a 5¢ savings in the purchase of a product, a portion of which (such as a wrapper, band, box top, end flap, product seal or the like) is inserted in the proof-of-purchase coupon envelope to effect a 10¢ reduction in the cost of a second unit of the product. By this scheme, the chances of misredemption are significantly reduced, in that redemption of the second coupon precludes misredemption of the first coupon.

Accordingly, the primary object of the present invention is to provide means for effectively combining a conventional premium coupon with a proof-of-purchase coupon-envelope, whereby a successful promotional business scheme is achieved. In the preferred embodiment of the invention, a blank is provided having a first separable store redeemable premium coupon portion, and second portion that comprises a proof-of-purchase coupon portion that is foldable into a compartmented envelope for receiving a portion of the goods purchased with the aid of the first separable coupon.

A more specific object of the invention is to provide a proof-of-purchase envelope of the type described above, wherein one wall of the compartment contains a window through which an inserted part of previously purchased goods is clearly visible. The compartmented envelope includes also a closure flap which is so dimensioned as to permit viewing of the window and the object contained in the compartment even when the closure flap is folded forwardly to the envelope sealing position.

Other objects and advantages of the invention will become apparent from a study of the following specification when viewed in the light of the accompanying drawing, in which.

Figure 1:
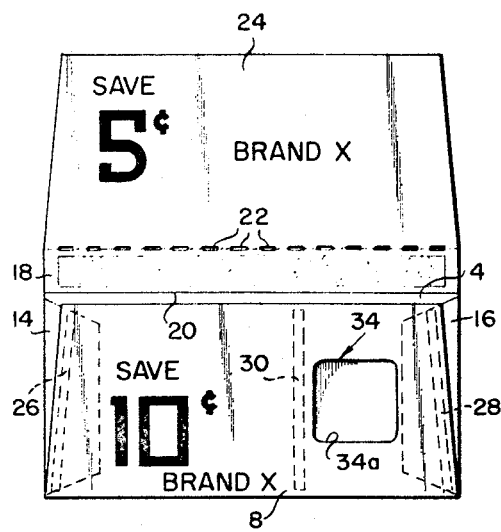
FIG. 1 illustrates the proof-of-purchase coupon envelope with the first store-redeemable premium coupon attached thereto.
Figure 2:
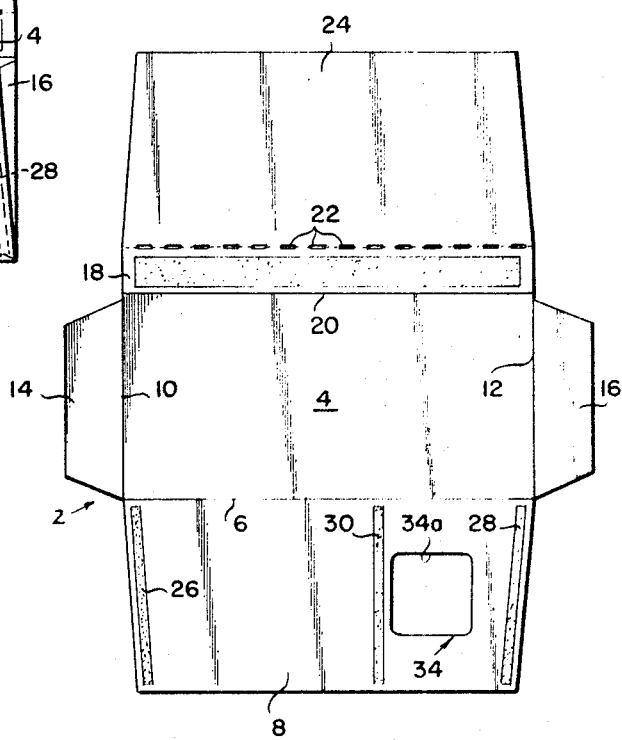
FIG. 2 illustrates the blank from which the envelope of FIG. 1 is formed.

Referring now to the drawings, the envelope blank 2 is formed of paper, kraft paper, paperboard or the like and includes a rectangular body portion 4 to the lower edge of which is connected by a horizontal first fold line 6 a front wall 8. Connected with the side edges of the body portion 4 by vertical second and third fold lines 10 and 12, respectively, are a pair of side walls 14 and 16. A closure flap 18 is connected with the upper edge of the body wall along the horizontal fourth fold line 20, and to the upper edge of this flap is connected by perforated line 22 the separable store redeemable premium coupon 24.

Figure 3:
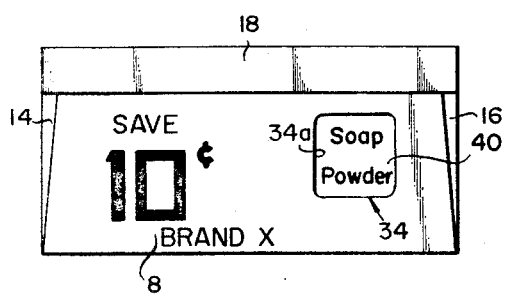
FIG. 3 illustrates the envelope in the closed sealed condition after detachment of the store redeemable coupon.

The front wall 8 is provided adjacent each side edge with a pair of first vertical adhesive strips 26, 28, which strips are operable—when the side and front walls are folded to the envelope defining position of FIG. 1—to secure the side walls 14 and 16 with the front wall 8, respectively. A second vertical strip of adhesive 30 is arranged between and spaced from the vertical hold lines 10 and 12 to secure together intermediate portions of the body portion 4 and front wall 8 to define a pair of open topped compartments. The front wall portion of one of the compartments contains a window 34 the lower edge 34a of which is spaced from the horizontal fold line 20 a distance greater than the width of the closure flap 18. Consequently, when the closure flap 18 is folded down to the envelope sealing position of FIG. 3, at least a part of the window 34 is exposed to view.

In operation, assume that the store redeemable premium coupon 24 is worth 5¢. Assume also that the envelope comprises a proof-of-purchase premium coupon worth 10¢. When the premium coupon 24 is removed by severing along the perforated line 22, it may be redeemed at the store and applied as a reduction of 5¢ in the selling price of a box of "brand X." After the purchased box has been transported to the home of the purchaser, a portion 40 (i.e., a wrapper portion, box top portion or the like) is removed and inserted into the envelope compartment beneath window 34, whereupon the resultant proof-of-purchase package of FIG. 3 may then be subsequently redeemed at the store to effect a 10¢ reduction in the next purchase.

There are, of course, many alternatives to the preferred construction of the present invention. Since premium coupons are generally distributed by cooperative mailings or by binding into periodical publications, the construction of the envelope may be varied somewhat in accordance with the weight of the paper used, and as to whether or not the user must form the envelope, by folding, from an initially flat blank.

What is claimed is:

1. In a compartmented proof-of-purchase envelope including a blank having a rectangular body portion, a front wall portion connected with the lower edge of said body portion along a horizontal first fold line, a pair of side walls connected with the ends of said body portion along vertical second and third fold lines, respectively, a closure flap portion connected with the top edge of said body portion along a horizontal fourth fold line, and a store redeemable premium coupon portion connected with the top edge of said closure flap along a perforated line, said side walls being foldable inwardly against said body portion and said front wall being foldable upwardly against said side walls and said body portion to an envelope-defining position, and first generally vertical adhesive strip means for securing each side wall to said front wall; the improvement which comprises
  second generally vertical adhesive strip means between and spaced from said second and third fold lines for securing together intermediate portions of said front and body walls to define a pair of open-topped compartments, the front wall portion of one of said compartments containing between said second adhesive strip means and one of said second and third fold lines a window opening; and
  fourth adhesive strip means carried by said closure flap and operable upon removal of said premium coupon portion and downward folding of said closure flap to an envelope-closing position to secure said closure flap to said front wall portion, the distance between said fourth fold line and the lower edge of the window being greater than the distance between said fourth fold line and said perforated line, whereby at least a portion of the window is exposed beneath said closure flap to display an object inserted in said compartment.

References Cited
UNITED STATES PATENTS

| | | | |
|---|---|---|---|
| 3,132,796 | 5/1964 | O'Gorman | 229—92.3 |
| 3,152,751 | 10/1964 | Hiersteiner | 229—73 |

DAVID M. BOCKENEK, Primary Examiner

U.S. Cl. X.R.
229—71, 72